(12) United States Patent
Sutter, Jr.

(10) Patent No.: US 6,694,393 B1
(45) Date of Patent: Feb. 17, 2004

(54) METHOD AND APPARATUS FOR COMPRESSING INFORMATION FOR USE IN EMBEDDED SYSTEMS

(75) Inventor: Edward L. Sutter, Jr., Fanwood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 593 days.

(21) Appl. No.: 09/608,838

(22) Filed: Jun. 30, 2000

(51) Int. Cl.[7] .............................................. G06F 13/14
(52) U.S. Cl. ...................... 710/68; 711/129; 711/134; 711/171
(58) Field of Search ..................... 710/68; 711/129, 711/134, 171, 34

(56) References Cited

U.S. PATENT DOCUMENTS 5,675,666 A * 10/1997 Komuro et al. ............. 382/232
6,324,621 B2 * 11/2001 Singh et al. ................. 711/129

OTHER PUBLICATIONS

Zlib compression, version 1.13, www.info-zip.org/pub/infozip/zlib, pp. 1–4, 2000.
Architecture-Dependent File Format, a.out, www.wotsit.org/search.asp/a.out, 31 pages, Aug. 1992.

* cited by examiner

Primary Examiner—Abdelmoniem Elamin

(57) ABSTRACT

A program file or other type of information file for use in an embedded system is partially compressed in a host device and subsequently transferred to a non-volatile memory of the embedded system. The compressed portion of the file may include non-relocation data such as data sections, text sections, symbol tables, etc. The uncompressed portion includes relocation data such as section headers or a file header which identify one or more destination locations for corresponding parts of the file in a random access memory of the embedded system. A loading program running on a processor of the embedded system determines a destination location for at least part of the file within the embedded system without decompressing the compressed portion of the file. The invention advantageously eliminates the need for multiple file copy operations in transferring data between non-volatile memory and random access memory in an embedded system.

24 Claims, 2 Drawing Sheets

METHOD AND APPARATUS FOR COMPRESSING INFORMATION FOR USE IN EMBEDDED SYSTEMS

FIELD OF THE INVENTION

The present invention relates generally to processor-based systems, and more particularly to techniques for compressing programs and other information for use in such systems.

BACKGROUND OF THE INVENTION

A conventional embedded system is typically implemented as a circuit board including a central processing unit (CPU) or other type of processor, a random access memory (RAM), one or more input/output (I/O) devices, and an on-board non-volatile memory. The non-volatile memory is used by the system to store data, programs or other information.

In the case of programs, there are a number of different ways in which corresponding program code may be stored within the non-volatile memory of the system. A first approach is to store the program in a raw binary form, such that the CPU accesses the program directly in the nonvolatile memory. This generally requires that a loading program used by the CPU to access the program have some knowledge of the program stored in the non-volatile memory. A second approach is to store the program as a file containing information that instructs the loading program with regard to issues such as location of the program code in non-volatile memory, where to place the retrieved program code in RAM, how to start up the program, etc. An advantage of the second approach relative to the first is that the second approach eliminates the need for the loading program to have any specific knowledge of the program, i.e., it is a more "data driven" approach.

In one conventional implementation of the second approach described above, a program is stored in the non-volatile memory as a formatted program file. The loading program retrieves not only the program code, but also information in the file that instructs the loading program as to where to place the retrieved program code in RAM and how to start up the program. This information in the file is also referred to herein as "relocation data."

The above-noted file can be stored in the non-volatile memory in a compressed or an uncompressed form. An advantage of compression is that it saves on the amount of non-volatile memory space needed to store the program. However, compression also has the disadvantage of requiring processor time and memory capacity to execute.

The following example illustrates in more detail the disadvantages associated with conventional program file compression in an embedded system. Assume a file is compressed on a host processing device, such as a personal computer (PC). It is then transferred to the embedded system in its compressed form. At some later point in time, the CPU of the embedded system decompresses the file into a designated memory space 'A' in order to access the relocation data. The relocation data is then read and, based on the relocation data, the program is transferred to memory space 'B' and executed.

The use of conventional program file compression in an embedded system thus requires two separate memory copy operations, the first to decompress the file in order to allow the CPU to access the relocation data, and the second to perform the specified relocation.

A need therefore exists for an improved compression approach for use in conjunction with embedded systems, which overcomes the above-noted disadvantages of conventional file compression.

SUMMARY OF THE INVENTION

The invention provides improved techniques for compressing information for use in an embedded system.

In accordance with one aspect of the invention, a program file or other type of information file for use in an embedded system is partially compressed in a host device and transferred to a nonvolatile memory of the embedded system. The compressed portion of the file in an illustrative embodiment may include non-relocation data such as data sections, text sections, symbol tables, etc. The uncompressed portion in the illustrative embodiment includes relocation data such as section headers or a file header which identify one or more destination locations for corresponding parts of the file in a random access memory of the embedded system.

In accordance with another aspect of the invention, a loading program running on a processor of the embedded system determines a destination location for at least part of the file within the embedded system without decompressing the compressed portion of the file.

Advantageously, the invention eliminates the need for multiple file copy operations in the process of transferring data between non-volatile memory and random access memory in an embedded system.

These and other features and advantages of the present invention will become more apparent from the accompanying drawings and the following detailed description.

DETAILED DESCRIPTION OF THE INVENTION

The invention will be illustrated herein in conjunction with an exemplary embedded system. It should be understood, however, that the invention is more generally applicable to any type of embedded system in which it is desirable to provide improved performance through more efficient compression of information. The term "embedded system" as used herein is intended to include any device or system which incorporates a central processing unit (CPU) or other type of processing device. The invention thus does not require that the embedded processing device in a given system have any particular configuration. Other examples of processing devices that may be used in conjunction with the invention include, without limitation, microprocessors or digital signal processors (DSPs), as well as portions and combinations of these and other devices. The term "file" as used herein is intended to include not only a program, a set of programs, or portions or combinations thereof, but also other arrangements of information suitable for use in an embedded system.

Figure 1:
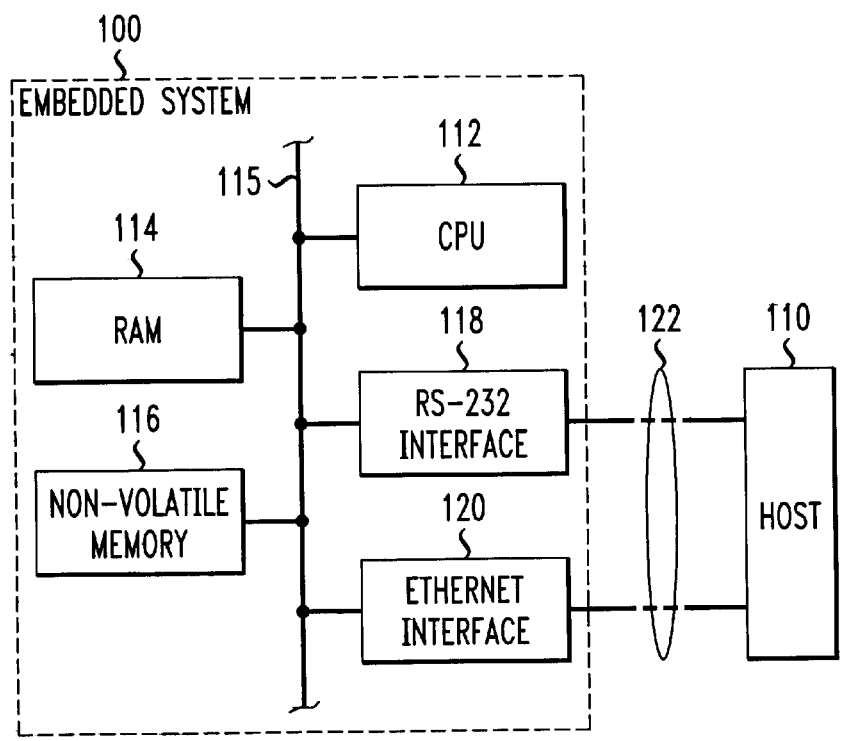
FIG. 1 shows an illustrative embodiment of an embedded system in which the present invention is implemented.

FIG. 1 shows an illustrative embodiment of a embedded system 100 in which the present invention is implemented. The embedded system 100 interfaces with a host 110, which may be, for example, a personal computer (PC) or other processor-based device external to the embedded system 100. The embedded system 100 in this illustrative embodiment includes a CPU 112, a random access memory (RAM) 114, and a non-volatile memory 116, all coupled to a bus 115. In operation, the CPU 112 executes programs that are stored in the RAM 114, such as a loading program as well as one or more other programs that may be loaded from the non-volatile memory 116 by the loading program into the RAM 114. Also coupled to the bus 115 are an RS-232 interface 118 and an Ethernet interface 120. The embedded system 100 communicates with the host 110 via the interfaces 118 and 120 and a corresponding set of communication lines 122.

The embedded system 100 may be in the form of a circuit board or set of circuit boards having the elements 112, 114, 115, 116, 118 and 120 mounted thereon. However, as previously noted, the invention does not require any particular arrangement or configuration of elements, and non-circuit board arrangements could also be used.

In accordance with the present invention, a program or other set of information in the form of a file to be utilized within the embedded system 100 is compressed in a manner which facilitates subsequent processing of the information in the embedded system. For example, in the illustrative embodiment to be described herein, a designated portion of the file is left uncompressed, such that the above-noted loading program running on the CPU 112 can determine the appropriate placement in RAM 114 for a program file retrieved from the non-volatile memory 116. This allows the loading program to read the file headers immediately and decompress each section directly from the compressed file into the appropriate destination. Advantageously, this approach of the present invention eliminates the need for an initial decompression of the entire file, as is typical in the previously-described conventional approach.

The compression in accordance with the techniques of the invention is typically performed on the host 110, but may be performed elsewhere, such as on another host or other type of processing device not coupled to the embedded system. The term "host device" as used herein is intended to include any type of computer, processing system or other device that may be used to compress information for use in an embedded system.

Figure 2:
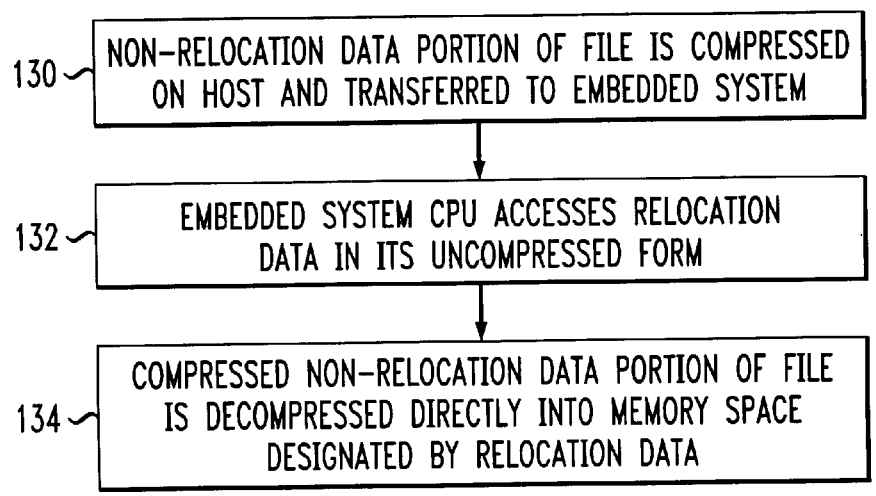
FIG. 2 is a flow diagram of a compression process that may be implemented in the embedded system of FIG. 1 in accordance with the present invention.

FIG. 2 shows a flow diagram illustrating the processing of a given file using compression techniques in accordance with the present invention. In step 130, a portion of the file is first compressed on the host 110 and subsequently transferred to the embedded system 100. The portion of the file compressed in step 130 in this embodiment comprises a non-relocation data portion of the 5 file, such that a relocation data portion of the file remains uncompressed. The resulting partially-compressed file when transferred to the embedded system is stored in the non-volatile memory 116.

In step 132, the CPU 112 of the embedded system 100 accesses the relocation data portion of the transferred file in its uncompressed form as stored in the non-volatile memory 116. This operation is typically performed by the above-noted loading program that is running on the CPU 112 in the illustrative embodiment.

As previously noted, relocation data for a given program file generally includes information that instructs the loading program as to where to place retrieved program code in RAM and how to start up the program. However, the term "relocation data" as used herein is intended to refer more generally to any type of data which is indicative of a location in an embedded system memory space into which a given file or portion thereof is to be loaded for execution.

In step 134 of FIG. 2, the compressed non-relocation data portion of the file is decompressed directly into the memory space designated by the relocation data. As noted above, this advantageously avoids the need for two separate memory copy operations.

A more detailed example illustrating the memory space advantages provided by the present invention will now be described in conjunction with FIGS. 3 and 4. The non-volatile memory 116 of the embedded system 100 is assumed in this example to be implemented as a Flash memory. In addition, this example uses a typical application program file, which may be a file of a type known in the art as a COFF, ELF or AOUT file. Additional details regarding COFF, ELF and AOUT files can be found in, e.g., G. R. Gircys, "Understanding and Using COFF," O'Reilly & Associates, 1990; M. L. Nohr, "Understanding ELF Object Files and Debugging Tools," UNIX Press, 1994; and http://www.wotsit.org/search.asp, respectively. Each of these file formats may have multiple sections of text and data that must be transferred out of the Flash memory space of the embedded system, and into a designated portion of the RAM space that the application program was designed to run in. In accordance with the invention, these files are decompressed by decompressing each of the sections within the file from its corresponding Flash memory space directly into the appropriate RAM space for the section.

Figure 3:
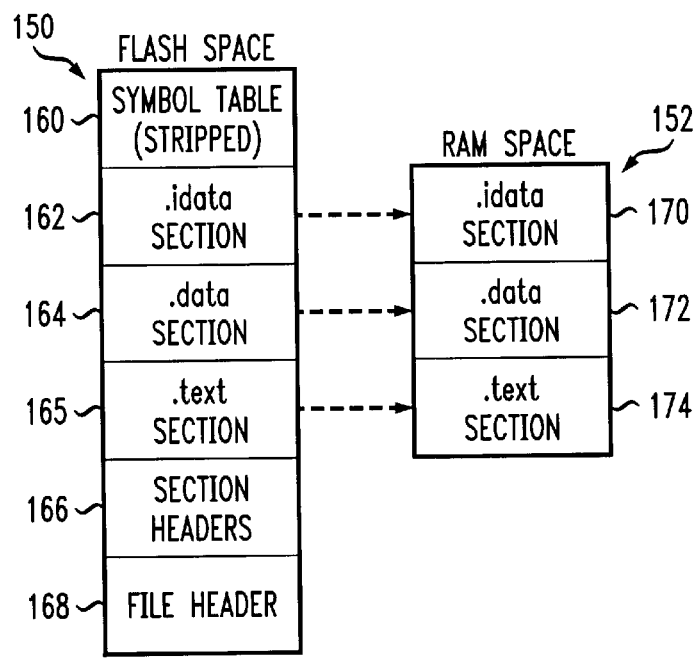
FIG. 3 illustrates the operation of a conventional uncompressed information transfer in an embedded system of the type shown in FIG. 1.

For purposes of comparison with the techniques of the invention, FIG. 3 shows the conventional transfer of a file of the type described above from a Flash memory space 150 to a RAM space 152 in the embedded system 100 without the use of compression. The Flash memory space 150 corresponds to a portion of the non-volatile memory 116 of FIG. 1, while the RAM space 152 corresponds to a portion of the RAM 114 of FIG. 1. The Flash space 150 in FIG. 3 stores a file which includes a stripped symbol table 160, data sections 162 (.idata) and 164 (.data), a text section 165 (.text), a set of section headers 166 and a file header 168. The data sections 162, 164 and text section 165 in this uncompressed example are copied to corresponding sections 170, 172 and 174, respectively, in the RAM space 152.

Figure 4:
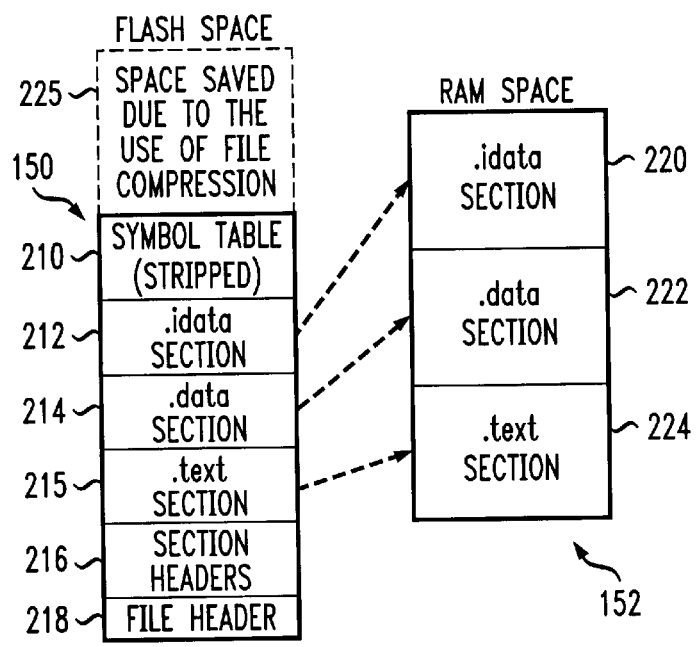
FIG. 4 illustrates the operation of an example information compression technique in accordance with the present invention.

FIG. 4 illustrates the transfer of the same example file from the Flash memory space 150 to the RAM space 152, using compression in accordance with the techniques of the invention. In this case, the non-relocation data portions of the file are stored in the Flash space 150 in a compressed format, while the relocation data portions of the file are stored in the Flash space 150 in an uncompressed format, in the manner described in conjunction with the flow diagram of FIG. 2. The compressed non-relocation data portions of the file include the symbol table 210, the data sections 212 and 214, and the text section 215. The use of compression on these portions of the file is illustrated in FIG. 4 by the reduced size of these portions relative to the corresponding portions of the uncompressed file as shown in FIG. 3. The uncompressed relocation data portions of the file include the section headers 216 and the file header 218. The absence of compression on these portions of the file is illustrated in FIG. 4 by the size of these portions being the same as that of the corresponding portions of the uncompressed file as shown in FIG. 3.

The uncompressed section headers 216 and file header 218 are used by the loading program running on the CPU 112 to determine the appropriate destination locations for the different sections of the file in the RAM space 152. The sections 212, 214 and 215 are then decompressed by the loading program directly into the designated destination sections 220, 222 and 224, respectively. The decompression is illustrated by the increased size of the sections 220, 222 and 224 relative to the corresponding compressed sections 212, 214 and 215. Element 225 in FIG. 4 denotes the amount of Flash memory space 150 which is saved through the use of compression.

It should be noted that some post-processing of the final application program file built on a given host using COFF, ELF or AOUT support tools may be needed in order to implement the compression techniques in the above example, as will be apparent to those skilled in the art. However, it should be understood that the invention does not require the use of any particular type of program file or support tool.

The present invention can be implemented using a wide variety of different types of file compression. For example, the files illustrated in FIG. 4 may be compressed using well-known Huffman or zlib compression. Huffman compression is described in greater detail in, e.g., A. Binstock, "Practical Algorithms for Programmers," Addison-Wesley, 1995, and zlib compression is described in greater detail at, e.g., http://www.info-zip.org/pub/infozip/zlib. Huffinan compression can provide a reduction in required file storage space on the order of about 15–20%, while the zlib compression can provide a reduction in required file storage space of as much as 70%. Other types of file compression can also be used in conjunction with the invention.

The present invention may be configured to meet the requirements of a variety of different embedded system processing applications and environments, using any desired types and arrangements of processors, memories and other embedded system elements. The above-described embodiments of the invention are therefore intended to be illustrative only. For example, other embodiments may use different types of programs, such as a monitor program, to perform the information processing operations described herein. As another example, the invention may be implemented at least in part as one or more software programs stored on a machine-readable medium. These and numerous alternative embodiments within the scope of the following claims will be apparent to those skilled in the art.

What is claimed is:

1. A method of processing information for use in an embedded system, the method comprising the steps of:

partially compressing a file containing the information such that a first portion of the file is compressed and a second portion of the file remains uncompressed; and storing the partially compressed file in a non-volatile memory of the embedded system, wherein a program running on a processor of the embedded system determines a destination location for at least part of the file within the embedded system without decompressing the compressed portion of the file.

2. The method of claim 1 wherein the embedded system comprises the non-volatile memory and a random access memory, and the destination location for the file is within the random access memory.

3. The method of claim 1 wherein the first portion of the file comprises a non-relocation data portion of the file.

4. The method of claim 3 wherein the non-relocation data portion comprises at least one of a symbol table, a data section and a text section.

5. The method of claim 1 wherein the second portion of the file comprises a relocation data portion of the file.

6. The method of claim 5 wherein the relocation data portion comprises at least one of a section header and a file header.

7. The method of claim 1 wherein the program comprises a loading program operative to decompress at least part of the compressed portion of the file into a designated location in another memory of the embedded system.

8. The method of claim 1 wherein the step of partially compressing the file is performed in a host device from which the resulting partially compressed file is transferred to the non-volatile memory of the embedded system.

9. An apparatus for use in processing information in an embedded system, the apparatus comprising:

a non-volatile memory for storing a partially compressed file containing the information, the partially compressed file having a first portion that is compressed and a second portion that is uncompressed; and a processor coupled to the non-volatile memory and operative to execute at least a portion of a program that determines a destination location for at least part of the file within the embedded system without decompressing the compressed portion of the file.

10. The apparatus of claim 9 wherein the embedded system further comprises a random access memory coupled to the processor, and the destination location for the file is within the random access memory.

11. The apparatus of claim 9 wherein the first portion of the file comprises a non-relocation data portion of the file.

12. The apparatus of claim 11 wherein the non-relocation data portion comprises at least one of a symbol table, a data section and a text section.

13. The apparatus of claim 9 wherein the second portion of the file comprises a relocation data portion of the file.

14. The apparatus of claim 13 wherein the relocation data portion comprises at least one of a section header and a file header.

15. The apparatus of claim 9 wherein the program comprises a loading program operative to decompress at least part of the compressed portion of the file into a designated location in another memory of the embedded system.

16. The apparatus of claim 9 wherein a compression operation used to generate the partially compressed file is performed in a host device from which the resulting partially compressed file is transferred to the non-volatile memory of the embedded system.

17. An embedded system comprising:

a random access memory;

a non-volatile memory for storing a partially compressed file having a first portion that is compressed and a second portion that is uncompressed; and a processor coupled to the random access memory and the non-volatile memory and operative to execute at least a portion of a program that determines a destination location for at least part of the file within the random access memory without decompressing the compressed portion of the file.

18. An apparatus for use in conjunction with an embedded system, the apparatus comprising:

a host device operative to partially compress a file for use in the embedded system such that a first portion of the file is compressed and a second portion of the file remains uncompressed;

wherein the partially compressed file is transferred from the host device to a non-volatile memory of the embedded system, and further wherein a program running on a processor of the embedded system determines a destination location for at least part of the file within the embedded system without decompressing the compressed portion of the file.

19. An article of manufacture comprising a storage medium for storing one or more programs for use in conjunction with an embedded system, the one or more programs when executed implementing the step of:

partially compressing a file for use in the embedded system such that a first portion of the file is compressed and a second portion of the file remains uncompressed;

wherein the partially compressed file is transferred from the host device to a nonvolatile memory of the embedded system, and further wherein a program running on a processor of the embedded system determines a destination location for at least part of the file within the embedded system without decompressing the compressed portion of the file.

20. A method of processing information for use in an embedded system, the method comprising the step of:

partially compressing a file containing the information such that a first portion of the file is compressed and a second portion of the file remains uncompressed;

wherein the partially compressed file is transferred to the embedded system and stored in a non-volatile memory of the embedded system, and further wherein a program running on a processor of the embedded system determines a destination location for at least part of the file within the embedded system without decompressing the compressed portion of the file.

21. A method of processing information for use in an embedded system, the method comprising the steps of:

partially compressing a file containing the information such that a first portion of the file is compressed and a second portion of the file remains uncompressed; and storing the partially compressed file in a non-volatile memory of the embedded system, wherein a program running on a processor of the embedded system determines a destination location for at least part of the file within the embedded system using the uncompressed second portion of the file.

22. An apparatus for use in processing information in an embedded system, the apparatus comprising:

a non-volatile memory for storing a partially compressed file containing the information, the partially compressed file having a first portion that is compressed and a second portion that is uncompressed; and a processor coupled to the non-volatile memory and operative to execute at least a portion of a program that determines a destination location for at least part of the file within the embedded system using the uncompressed second portion of the file.

23. An apparatus for use in conjunction with an embedded system, the apparatus comprising:

a host device operative to partially compress a file for use in the embedded system such that a first portion of the file is compressed and a second portion of the file remains uncompressed;

wherein the partially compressed file is transferred from the host device to a non-volatile memory of the embedded system, and further wherein a program running on a processor of the embedded system determines a destination location for at least part of the file within the embedded system using the uncompressed second portion of the file.

24. A method of processing information for use in an embedded system, the method comprising the step of:

partially compressing a file containing the information such that a first portion of the file is compressed and a second portion of the file remains uncompressed;

wherein the partially compressed file is transferred to the embedded system and stored in a non-volatile memory of the embedded system, and further wherein a program running on a processor of the embedded system determines a destination location for at least part of the file within the embedded system using the uncompressed second portion of the file.

* * * * *